J. MENU.
MUD GUARD.
APPLICATION FILED FEB. 11, 1913. RENEWED JULY 3, 1919.
1,366,408.
Patented Jan. 25, 1921.
2 SHEETS—SHEET 2.
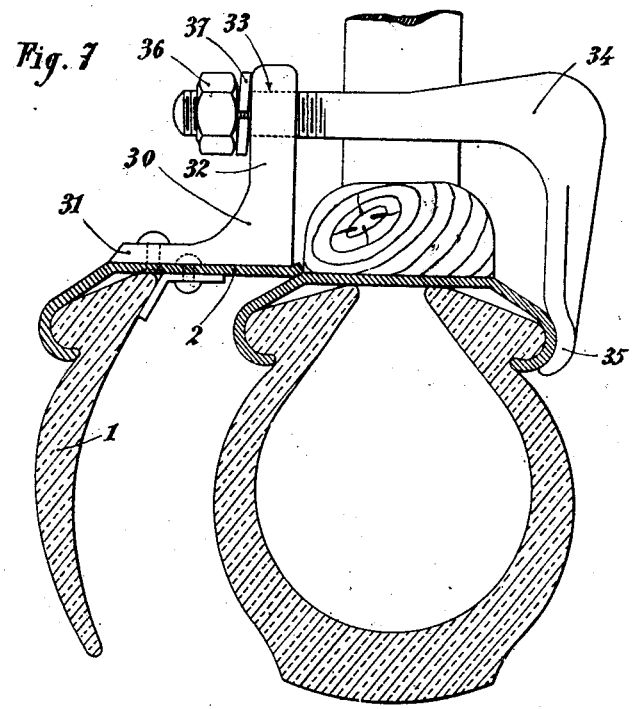
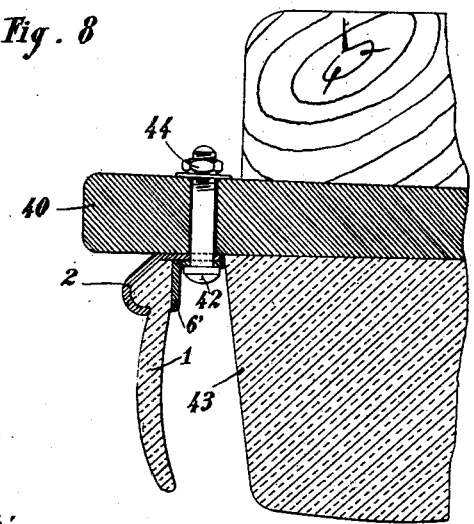

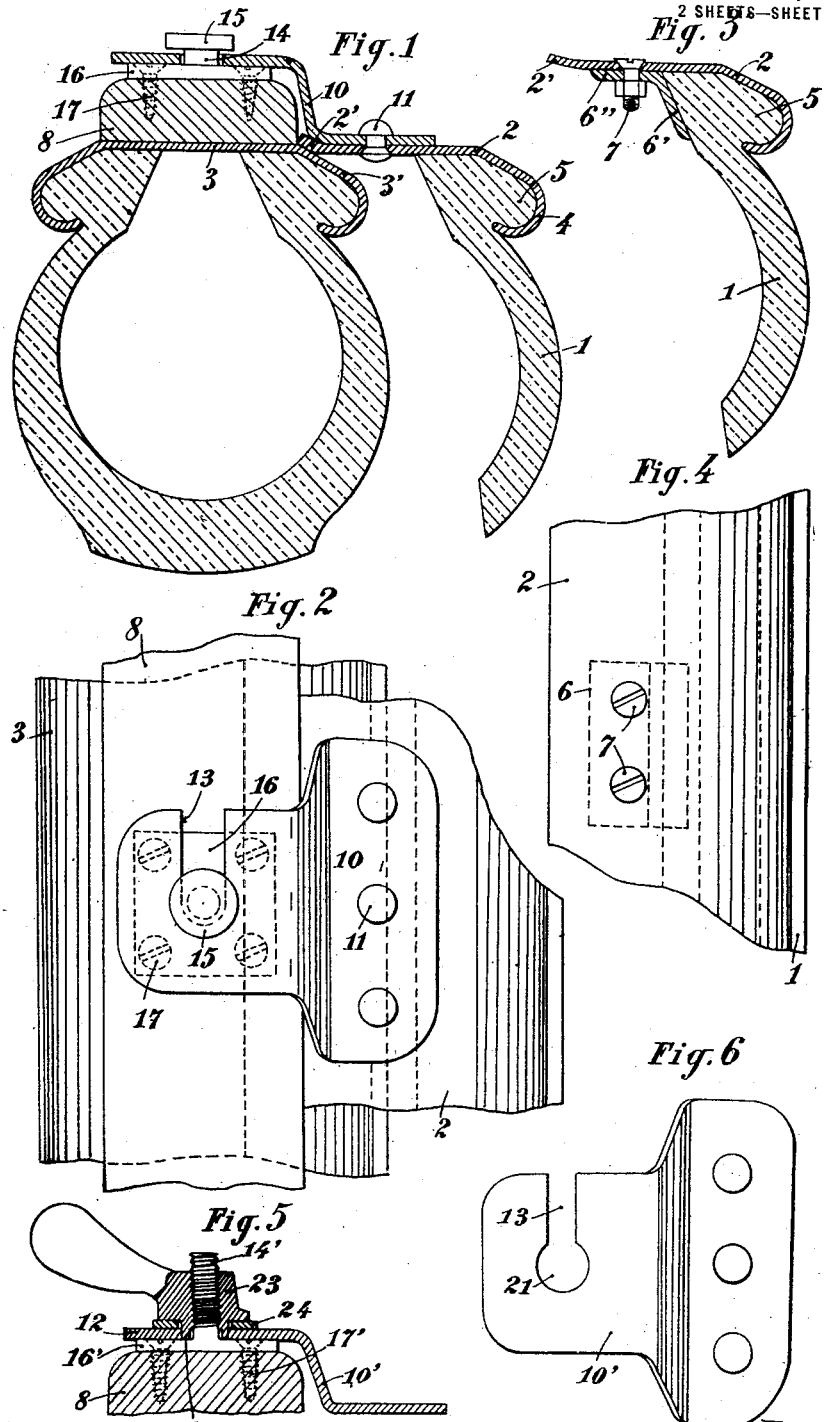

UNITED STATES PATENT OFFICE.

JULES MENU, OF PARIS, FRANCE.

MUD-GUARD.

1,366,408. Specification of Letters Patent. Patented Jan. 25, 1921.

Application filed February 11, 1913, Serial No. 747,730. Renewed July 3, 1919. Serial No. 308,537.

*To all whom it may concern:*

Be it known that I, JULES MENU, a citizen of the Kingdom of Belgium, residing at 11 Passage de l'Elysee des Beaux-Arts, Paris, in the Republic of France, have invented certain new and useful Improvements in Mud-Guards, of which the following is a specification.

The invention has for its object improvements in the construction and in the means for mounting and fixing to vehicle wheels, mud guards of the type of those in which the annular crown forming the screen is fixed to the wheel and rotates with it.

In accordance with the invention, the annular screen or mud guard proper is mounted upon a false metal rim of appropriate section to insure rigidity and which fits the rim of the wheel and is detachably fixed to the wheel, preferably to the rim of the latter, in such a manner as to form, so to speak an external extension of this rim in constituting a rigid cylindrical fitting or frame protecting the screen from external shocks. For example this false rim is most advantageously constituted like a metal pneumatic tire rim, preferably like a hooked or channeled rim for beaded tires with this difference that a channel is provided upon the outer side only, in other words the false rim is constituted as or by a divided metal rim (a steel rim for pneumatic tires). For its part the annular screen may be constituted as or by the lateral portion of the outer cover or casing of a pneumatic tire most conveniently of the clencher type, the bead being engaged in the hook or channel of the false rim and held in place by angle pieces or other appropriate devices fixed to the false rim. This false rim carrying its annular ring is fitted at its inner side upon the rim of the wheel upon which it is mounted and it is detachably fixed in this position by appropriate means. Finally the invention relates to devices for engaging and locking the false rim upon the wooden wheel rim, which permit of a particularly simple and rapid mounting and dismounting.

The accompanying drawings show by way of example a method of carrying the invention into practice in the three cases of a wooden wheel, of a metal wheel and finally of a lorry or motor omnibus wheel, but it should be clearly understood that this is merely by way of example and that both the form of the false rim and of the annular screen in cross section, and the means for fixing the false rim to the wheel may vary, the main idea being to provide a false rim which protects the screen and which fits the wheel rim in such a manner as to acquire the rigidity of the wheel.

Figures 1 to 6 represent a constructional form particularly applicable to wooden wheels for pneumatic tires; Figs. 1 and 2 are a cross section and a partial plan, respectively, of the mud guard mounted upon the wheel, Figs. 3 and 4 are similar views showing the mud guard separately, Figs. 5 and 6 show in detail in section and in plan, respectively, one of the lugs for fixing the false rim to the wheel rim with its locking device. Fig. 7 shows in cross section means for fixing the rim particularly applicable to metal wheels for pneumatic tires. Finally Fig. 8 shows the same type of mud guard mounted upon a motor omnibus wheel with protruding metal rim.

In the construction shown in Figs. 1 to 6 the flexible ring or mud guard screen 1 which may be constituted, for example, by a portion of a worn or discarded pneumatic tire, is mounted (Figs. 3 and 4) upon a false rim 2 similar to the metal rim 3 of the wheel but comprising a single hook or retaining flange 4 in which the beading 5 of the ring 1 engages exactly in the usual manner. The fixing of the ring 1 upon the false rim 2 is effected by means of a suitable number of small angle pieces or lugs 6. One arm 6' of each of these angle pieces bears against the inner edge of the beading 5 while the other arm 6" is fixed by means of screws and nuts 7 or in some other convenient manner to the false rim 2.

The mud guard this constituted can be fitted (Figs. 1 and 2) to the inner face of the metal wheel rim, the inner edge 2' of the false rim fitting upon closely against the metal wheel rim in the angle formed by the inclined surface 3' of the latter and the lateral wall of the wooden rim or felly. In order that the false rim, which is of substantially the same diameter as the wheel rim, may fit the latter, its inner edge 2' is pressed slightly conical in such a manner as to fit exactly the surface 3'. The centering and the strength of the assemblage are thus realized in the most simple and expeditious manner merely by the angular fitting of the metal rim and the wooden wheel rim.

The fixing of the mud guard upon the wheel is effected by means of engaging lugs or brackets 10, a suitable number of which are distributed over the periphery of the false rim to which they are fixed by means of rivets 11 or otherwise. Each of these lugs or brackets has a double bend to provide a portion adapted to overlie the inner side of the wheel rim or felly, said portion being channeled or slotted as at 13 to engage studs 14, having heads 15 and mounted on base or bearing plates 16 which are secured as by screws 17 to the wheel rim or felly. In order to engage the mud guard, it is only necessary, after pressing it laterally in position upon the wheel rim, to rotate it in its plane in the proper direction in such a manner as to engage its slots 13 with the studs 14 fixed to the rim.

In order to prevent accidental dislodgement of the mud guard thus mounted on the wheel, a locking device constituted in the following manner is provided: One of the studs 14 (or several of them) is replaced (Fig. 5) by a threaded rod 14' fixed in a similar manner to the rim by means of a plate 16' and of screws 17' and the bottom of the channel 13 formed in the corresponding engaging lug 10' represented in Fig. 6 presents a circular portion of greater width 21 in which the collar 22 of a wing nut 23 engages. A Grover washer 24 can be interposed between the base of the nut 23 and the lug 10' to prevent accidental loosening of the nut. When the mud guard has been fitted to the wheel, in order to lock it it is only necessary to screw the wing nut upon the threaded rod, the collar 22 engaging in the slot 21 and locking the whole. The unscrewing or the screwing of a single nut through a few turns is thus sufficient to permit of removing or fitting the mud guard, so that these operations can be effected with the greatest rapidity.

This method of fixing by means of a bayonet joint is particularly advantageous from the point of view of the rapidity of fitting, convenience in use and good appearance; it merely necessitates a slight modification in the wheels of automobiles which consists in fixing thereon the plates 16, 16' with an engaging stud which might be difficult in the case of a metal wheel owing to the small interval between the spokes.

Fig. 7 shows a method of fixing or clamping particularly applicable to metal wheels and which, while being easy to effect and very secure, eliminates any necessity for adjustment of the wheel with the mud guard and enables the mud guard to be despatched ready for fitting to the wheel without any preliminary operation. Upon the periphery of the false rim a suitable number of angle pieces 30 are arranged, three or four being adequate. One branch 31 of these angle pieces is riveted or otherwise fixed to the false rim while its other branch 32 is provided with an eye 33. The threaded end of a clamp 34 passes through this eye; this clamp is bent hook-shaped and ends in a portion 35 which follows the contour of the back of the hook or channel of the metal wheel rim. A nut 36 which is preferably locked by a Grover washer 37 produces the clamping. In order to dismount the mud guard it is only necessary to unscrew the nuts 36 through a few turns in order to release the hooks 35 of the clamps 34 and permit of removing the mud guard. No part of the device then remains upon the wheel.

Fig. 8 represents the adaptation of the same constructional form of the invention as that described above to a lorry or motor omnibus wheel with protruding metal rim. In this case the false rim 2 is adapted to the outer periphery of the protruding metal rim 40, preferably sufficiently in retreat relatively to the outer edge thereof to be afforded protection from external shocks. The fixing of the false rim 2 to the wheel rim 40 can be effected by any convenient means for example by means of a bayonet joint, either similar to that represented in Figs. 1 to 6 or not, or else as represented in Fig. 8 by means of fixing bolts 41 the head 42 of which is preferably arranged sufficiently close to the tire 43 or to the arm 6' of the angle piece to be prevented from turning, the lock nut 44 being secured from accidental unscrewing by any convenient means such as a Grover washer, a pin or the like.

The mud guard device with false rim which forms the object of the invention and particularly its construction with a hook-shaped or channeled false rim and beaded screen, as illustrated, in addition to presenting the advantages set forth above, presents the further advantage of fixing the india rubber of the annular screen without the necessity for perforating this screen or passing bolts through it; passing bolts through india rubber presents serious inconveniences owing to the damage caused to the india rubber by the bolts as a result of vibration.

What I claim and desire to secure by Letters Patent of the United States is:—

1. A mud guard for vehicle wheels, having in combination an annular screen, a false rim having a peripheral hook engaging with a corresponding beading on said screen, angle pieces fixed to said false rim and holding the screen in engagement with the false rim, channeled lugs fixed to said false rim, studs and screws fixed on plates secured to the inner side of the wheel rim, and adapted to be engaged by said lugs and nuts adapted to be screwed on said screws for the purpose of fixing said lugs in position.

2. A mud guard for vehicle wheels comprising an annular screen support of cylindrical form and of approximately the same diameter as the metal rim of the wheel with which the guard is to be used, said support being formed at its inner edge to closely engage such rim continuously around the entire periphery thereof and having a hook-shaped outer flange, means for removably securing said support in engagement with such rim, a screen having a bead fitting within said flange, and retaining lugs secured to said support and arranged to prevent dislodgment of said bead from the flange.

3. The combination, with a vehicle wheel and a rim mounted thereon and provided with tire-retaining channels at both edges, of a false rim of substantially the same diameter as the wheel rim but provided with a retaining channel at its outer edge only, a flexible screen having a bead portion fitting within the retaining channel of the false rim, lugs secured to said support and holding said bead in place, and means securing said false rim with its inner edge engaging said wheel rim and with its retaining channel in substantially parallel relation to the outer retaining channel of the wheel rim.

4. A mud guard for vehicle wheels, having in combination with a wheel rim an annular screen, a false rim having a peripheral hook engaging with a corresponding beading on said screen, angle pieces fixed to the outer side of said false rim and holding the screen in engagement with the false rim, bolts and nuts for rigidly connecting said angle pieces, said false rim and said wheel rim in such a manner that the false rim is in retreat relatively to the outer edge of the wheel rim, and means for locking said nuts.

5. The combination, with a vehicle wheel having a laterally projecting rim and a tire mounted thereon, of a mud guard comprising an annulus or false rim carried on the outer periphery of the wheel rim and set back at a distance from the edge thereof so that the wheel rim projects laterally beyond a vertical plane tangent to the outer edge of said false rim, said false rim having a channeled or hook-shaped portion, a flexible annular screen having a bead arranged to fit within said hook-shaped portion, angle pieces arranged to hold said bead in position, and means for securing together said angle pieces, false rim and wheel rim.

In testimony whereof I affix my signature in presence of two witnesses.

JULES MENU.

Witnesses:
 GEORGES PROTTE,
 LUCIEN MEMMINGER.